Dec. 10, 1963  J. MÜLLER  3,113,469
STEERING GEAR
Filed Dec. 5, 1960  2 Sheets-Sheet 1
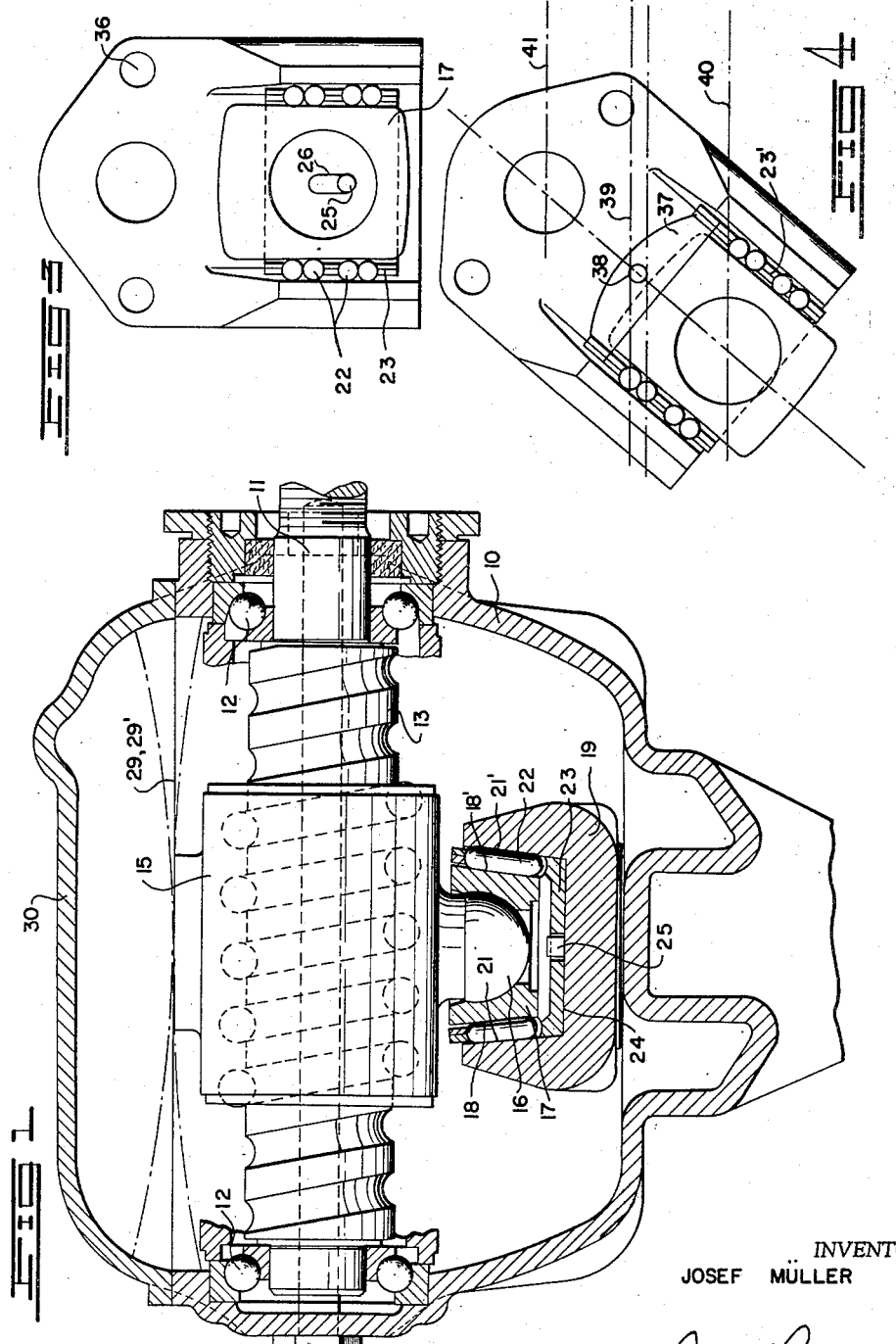
INVENTOR
JOSEF MÜLLER
BY Dicke, Craig & Freudenberg
ATTORNEYS

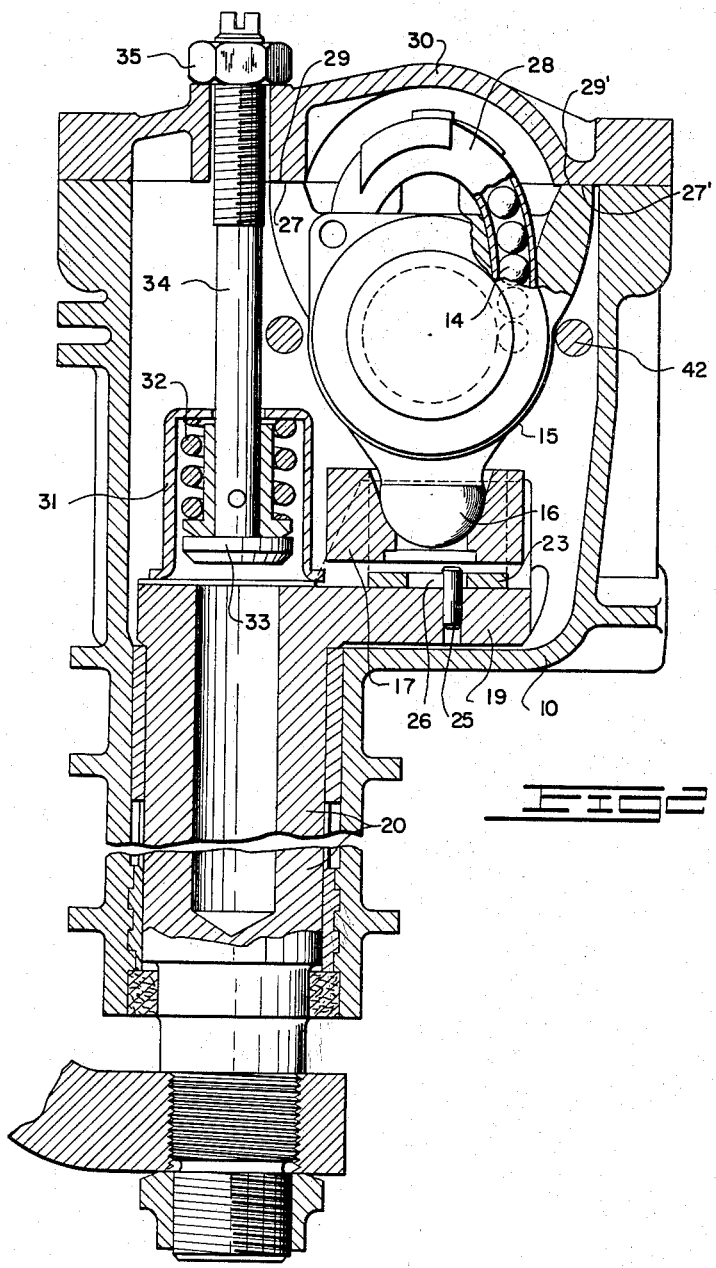

3,113,469
STEERING GEAR
Josef Müller, Stuttgart-Riedenberg, Germany, assignor to Daimler-Benz Aktiengesellschaft, Stuttgart-Unterturkheim, Germany
Filed Dec. 5, 1960, Ser. No. 73,663
Claims priority, application Germany Dec. 19, 1959
22 Claims. (Cl. 74—499)

The present invention relates to a steering gear provided with a circulating chain of balls or roller members for motor vehicles in which the steering nut member engages into a sliding member which is guided within an arm portion of the steering lever shaft and is movable radially with respect to the axis of the steering lever shaft within this arm portion.

With the known constructions of the prior art of circulatory ball steering gears of the type mentioned hereinabove, the sliding member is movable with mutually parallel surfaces in one or two fork-shaped arms of the steering lever shaft. The steering nut engages thereby with a cylindrical pin thereof into the sliding member. However, this prior art construction is disadvantageous because it permits only of a complicated readjustment by special means after an intolerable play has occurred between the sliding member and the lever or between the pin and the sliding member during operation. Additionally, the assembly and installation is complicated in these prior art constructions, especially with two arms arranged on the steering lever shaft.

The present invention is concerned with the elimination of the aforementioned disadvantages. The present invention solves the underlying problem by constructing the arm portion of the steering lever shaft as a rail structure with an approximately U-shaped cross section open on one side thereof toward the steering nut and by providing the same with V-shaped inclined flanks or sides and by arranging, between the flanks of the rail-shaped arm portion and the correspondingly inclined side surfaces of the sliding member, roller bodies of suitable construction. As roller bodies serve thereby appropriately needle bearings of known construction which are arranged between the two corresponding surfaces and are combined by a common guide cage.

It has been suggested previously to construct the sides of the steering lever shaft arm of essentially V-shape. However, this suggestion was made in connection with a circulatory-ball steering-gear assembly in which a conically-shaped pin of the non-rotatably guided steering nut engages directly into the arm portion of the steering lever shaft. Additionally, the V-shaped inclination is also known in connection with a sliding member gliding within the steering nut, however, such prior art construction did not relate to a circulatory ball steering gear assembly. It is also significant that with both of these two last-mentioned prior art arrangements, however, the interposition of roller bodies between the inclined sides is neither mentioned nor suggested so that the known prior art arrangements produce a disadvantageous friction between these sides as a result of the wedging effect during readjustments.

The construction according to the present invention offers the advantage that the steering lever shaft has a very short, compact and sturdy construction and may be manufactured as a forged piece by the application and use of simple manufacturing techniques. Furthermore, the possibility of an extremely simple and automatic readjustment and freedom of play of the steering gear is created by the inclined flanks or sides between the sliding member and the arm portion of the steering lever shaft, while, additionally, the friction is significantly reduced in the steering gear by the use of the roller bodies.

In one embodiment according to the present invention, the common guide cage for the needle bearings is limited in the movability thereof with respect to the rail-shaped arm portion of the steering lever shaft. However, according to another embodiment of the present invention, it is proposed to connect the guide cage with the steering nut member through a positive guidance by the fact that the guide cage engages with a projection thereof in a groove at the steering nut member which extends parallelly to the steering nut axis. It is possible to prevent in this manner that the cage changes its prescribed position in the center position of the steering gear.

Since only one arm portion for the reception of the spherically-shaped pin member of the steering nut member is provided at the steering lever shaft, which results in an extremely simple assembly, the steering nut member has to be supported against unintentional rotation on the steering spindle. This support takes place according to the present invention at the housing cover. Two parallel sliding surfaces are thereby arranged at the nut member laterally of the ball return ducts which sliding surfaces cooperate with corresponding support tracks at the housing cover.

This supporting arrangement at the readily interchangeable cover renders particularly advantageous a further feature and development of the present inventive concept according to which the supporting tracks are constructed in the manner of curve or cam tracks for purposes of achieving a predetermined steering characteristic so that the steering nut member during movement thereof out of the center position has to carry out forceably a limited and predetermined rotation about the axis of the steering spindle. As a result thereof, any desired characteristic of the steering, for example, a degressive steering may be attained in a simple and effective manner.

Accordingly, it is an object of the present invention to provide a steering gear assembly which obviates the disadvantages and shortcomings encountered in connection with the prior art constructions.

It is another object of the present invention to provide a steering gear construction in which a readjustment to compensate for wear between the sliding parts of the steering gear is rendered feasible in a most simple manner.

Still another object of the present invention resides in the provision of a steering gear in which any play between the movable parts thereof is automatically compensated for at all times and which also makes possible a manual readjustment to compensate for wear during operation without any great difficulty or special measures.

A further object of the present invention resides in the provision of a steering gear having all the advantages enumerated hereinabove which may be readily assembled and disassembled.

A still further object of the present invention resides in the provision of a steering gear providing an automatic readjustment for the play between the movable members which offers a minimum of friction.

Still a further object of the present invention resides in the provision of a steering gear construction in which the steering lever shaft has a very short, compact and sturdy construction that may be readily manufactured by simple manufacturing techniques.

Another object of the present invention resides in the provision of a steering gear construction which permits by extremely simple means the attainment of a predetermined steering characteristic, such as a degressive steering characteristic.

These and other objects, features and advantages of the present invention will become more obvious from the following description when taken in connection with the accompanying drawing which shows, for purposes of illustration only, several embodiments in accordance with the present invention, and wherein FIGURE 1 is a longitudinal cross sectional view through a steering gear in accordance with the present invention.

FIGURE 2 is a transverse cross sectional view through the steering gear of FIGURE 1.

FIGURE 3 is a top plan view of the arm portion of the steering lever shaft according to FIGURES 1 and 2 provided with an inserted sliding member, and FIGURE 4 is a top plan view of a modified embodiment of the arm portion of the steering lever shaft, similar to FIGURE 3, in which the parts are illustrated in an out-of-center position.

Referring now to the drawing wherein like reference numerals are used throughout the various views to designate corresponding parts, and more particularly to FIGURES 1 and 2, reference numeral 10 designates the housing of the steering gear in accordance with the present invention in which is supported the steering spindle 11 by appropriate bearings 12 of suitable construction. The housing 10 may be reinforced in the longitudinal direction of the spindle 11 by appropriate tensioning bolts 42, especially if it is constructed of lightweight metal and therefore is subjected to a relatively larger heat expansion. The steering spindle 11 is operatively connected with the steering column and steering wheel (not illustrated). Additionally, the steering spindle 11 is provided with a threaded part or worm portion 13 on which is arranged, in a manner known per se, the steering nut member 15 by the interposition of an endless chain of antifriction balls 14 whereby the steering nut member 15 is adapted to be moved axially on the worm portion 13 of the steering spindle 11 during rotation of the latter. A spherically shaped head portion or pin member 16 is arranged at or integrally formed directly with the steering nut 15. The steering nut member 15 engages with the spherically shaped head portion 16 thereof into a sliding member 17. As shown in FIGURE 3, the sliding member 17 has an approximately rectangularly-shaped contour. The side surfaces 18 and 18' (FIGURE 1) of the sliding member 17 are inclined approximately V-shaped toward each other.

The sliding member 17 is supported within an arm portion 19 of the steering lever shaft 20 (FIGURE 2) so as to be radially movable with respect to the steering lever shaft 20. The arm portion 19 is arranged at the end face of the steering lever shaft 20. The arm portion 19 has an approximately U-shaped cross section whereby it is open in the direction toward the steering nut member 15, and the flanks or sides 21 and 21' thereof (FIGURE 1) are also inclined in a V-shaped manner complementary to surfaces 18 and 18'. Several needle members 22 are inserted in the manner of a roller bearing between the flanks 21 and 21' and the side surfaces 18 and 18' of the sliding member 17. The needle members 22 are combined by a common cage 23. The arm portion 19, therefore, forms a guide rail, so to speak, for the sliding member 17.

The cage 23 is also constructed of approximately U-shape and surrounds the sliding member 17 in the same manner as the arm portion 19. A pin 25 is arranged in the bottom surface 24 of the arm portion 19 which engages in a slot 26 of the cage 23 (FIGURE 3). In this manner, the cage 23 cannot exceed a predetermined deflection and cannot displace itself in the center position of the steering gear from the position thereof between the arm 19 and the sliding member 17.

FIGURES 1 to 3 illustrate the various parts of the steering gear in accordance with the present invention in the respective center positions thereof. If the steering spindle 11 is rotated from this center position in either the clockwise or counterclockwise direction, then the steering nut member 15 is displaced from the position thereof illustrated in FIGURE 1 either toward the left or toward the right. The spherically shaped head portion 16 thereby takes along the sliding member 17 in the corresponding direction whereby the head portion 16 rotates in a suitably constructed socket portion of the sliding member 17. The arm portion 19 thereby also rotates the steering lever shaft 20 either in the clockwise or counterclockwise direction and the sliding member 17 moves radially outwardly within the arm portion 19. By reason of the interposition of the needle bearings 22 no friction occurs during such movement.

However, this operation is true only if the steering nut member 15 does not rotate in unison with the steering spindle 11, 13. Consequently, the steering nut member 15 has to be supported against rotation. For such support serve two sliding surfaces 27 and 27' (FIGURE 2) which are arranged at the nut member 15 on both sides of ball return ducts 28 and extend parallelly to the nut axis. These sliding surfaces 27 and 27' cooperate with correspondingly shaped plane support tracks 29 and 29' provided within the housing cover 30.

It is, therefore, within the designer's choice to construct the supporting tracks or cams 29 and 29' not, as illustrated in a plane and parallel manner with respect to the axis of the steering spindle 11 but to construct the same in the manner of a curved track or cam as illustrated, for example, in dot and dash line in FIGURE 1. In this manner a limited and predetermined rotation of the steering nut member 15 during actuation or rotation of the steering gear out of the center position thereof may be achieved, and the steering characteristic may be influenced, for example, in the manner of a degressive steering.

According to the present invention, the steering lever shaft 20 is maintained constantly in abutment against the spherically shaped head portion 16 of the nut member 15 by a spring element. For that purpose, a pot-shaped spring abutment 31 is emplaced on the end face of the steering lever shaft 20 and secured thereat, for example, with two screws 36 while a spring 32 is arranged within the pot-shaped spring abutment 31. The spring 32 abuts, on the one hand, against the bottom of the pot-shaped spring abutment 31 and, on the other, against a spring dish 33 which is arranged at a draw bolt 34. The latter is disposed in the extension of the axis of the steering lever shaft 20, i.e., coaxial with respect thereto, extends through the bottom of the pot-shaped spring abutment 31 and is adjustable with respect to the housing cover 30. It may be secured by means of a counter nut 35.

The steering lever shaft 20 is always pressed against the ball head portion 16 of the steering nut member 15 with a predetermined adjustable pretension by means of the spring 32. If wear occurs during operation between two mutually movable parts, then this wear is automatically compensated by the spring pretension. The spring pretension may also be regulated and readjusted however, by tightening the draw bolt 34 with the aid of the nut 35 with respect to the housing cover 30.

FIGURE 4 illustrates a modified embodiment in which the ball cage 23' for the needle bearings 22 is connected by a bridge-like portion 37 disposed above the sliding member 17 and between the spherically shaped head portion 16 and the steering spindle axis. A pin 38 is arranged on this bridge portion 37 which pin 38 engages into a groove 39 that is parallel to the axis of the steering nut 15. The pin 38 and groove 39 are appropriately disposed exactly in the center of the distance between the steering spindle axis 40 and the steering lever shaft axis 41. In this manner, the cage 23 is positively guided during steering movements of the steering gear and the pin 25 as well as the slot 26 may be dispensed with.

While I have shown and described several embodiments in accordance with the present invention, it is understood that the same is not limited thereto but is susceptible of many changes and modifications within the spirit and scope of the present invention and I, therefore, do not

I claim:

1. In a steering gear for motor vehicles, the combination comprising steering lever shaft means including arm means, sliding means movably guided within said arm means, steering nut means operatively connected with said sliding means by a spherically-shaped head portion, said arm means including a rail-like portion with approximately U-shaped cross section open in the direction toward said steering nut means and provided with flank portions outwardly diverging from the bottom portion of said U-shaped cross section, said sliding means being provided with correspondingly inclined side surfaces, and anti-friction means interposed between said diverging flank portions and said inclined side surfaces.

2. In a steering gear, the combination according to claim 1, wherein said anti-friction means includes a plurality of roller members, and common cage means for combining the roller members on both sides of said sliding means.

3. In a steering gear, the combination according to claim 2, further comprising limit means for limiting the relative movement of said sliding means with respect to said arm means.

4. In a steering gear provided with housing means, the combination according to claim 1, wherein said housing means and said steering nut means are provided with complementary support means to support said nut means with respect to said housing means.

5. In a steering gear, the combination according to claim 4, wherein said housing means includes a removable part, and wherein said complementary supporting means are provided at said nut means and said removable part.

6. In a steering gear, the combination according to claim 4, wherein said supporting means are constructed as curved cam track means to enable a predetermined limited movement of said steering nut means out of the center position thereof to thereby provide effectively a predetermined non-linear steering characteristic.

7. In a steering gear, the combination according to claim 1, further comprising means within said steering gear for constantly urging said arm means in the direction of said steering nut means to assure constant abutment of said steering lever shaft means with said steering nut means.

8. A steering gear, especially for motor vehicles, provided with a steering spindle, a steering nut member on said spindle and anti-friction ball means interposed between said steering spindle and said steering nut member, comprising steering lever shaft means including an arm portion, sliding means guided within said arm portion and movable radially with respect to the axis of said steering lever shaft means within said arm portion, said steering nut member having means projecting therefrom engaging into said sliding means, said arm portion being constructed as a rail-like portion with approximately U-shaped cross section open in the direction toward said steering nut member and provided with inclined flank portions, said sliding means being provided with correspondingly inclined side surfaces, and anti-friction roller means interposed between said inclined flank portions and said inclined side surfaces.

9. A steering gear according to claim 8, wherein said anti-friction roller means are needle bearings arranged between corresponding flank portions and side surfaces, respectively, and a common guide cage for combining the needle bearings on both sides of said sliding means.

10. A steering gear according to claim 9, further comprising abutment means for limiting the movement of said common guide cage with respect to said rail-like portion of said arm portion.

11. A steering gear according to claim 10, wherein said guide cage surrounds said sliding means in an essentially U-shaped manner, and wherein said guide cage is provided with a slot in the bottom surface thereof disposed between said sliding means and said arm portion, and a pin arranged at said arm portion engaging in said slot.

12. A steering gear according to claim 9, wherein said anti-friciton roller means includes a plurality of anti-friction roller members, and common cage means for said roller members, and means for positively guiding said cage means with respect to said steering nut member including a projection on said cage means located between the axis of said steering lever shaft means and the engagement of the steering nut member into said sliding means, said projection engaging in a groove provided at said steering nut member, and said groove extending parallel to the axis of said steering nut member.

13. A steering gear according to claim 12, wherein said projection is a pin-like member and wherein said pin-like member and said groove are located exactly in the center of the distance between the axis of said steering lever shaft means and the axis of said steering spindle.

14. A steering gear according to claim 8, further comprising housing means having a removable cover, and means supporting said steering nut member at said cover part to prevent rotation of said steering nut member with respect to said housing means.

15. A steering gear according to claim 14, wherein said steering nut member is provided with return ducts for the anti-friction ball means, and wherein said supporting means includes supporting tracks at said cover part cooperating with two parallel sliding surfaces arranged at said steering nut member laterally of said return ducts.

16. A steering gear according to claim 15, wherein said supporting tracks at said cover part are constructed as curve-tracks for achieving a predetermined steering characteristic so that the steering nut member upon movement thereof from its center position has to carry out a predetermined limited rotation about the axis of said steering spindle.

17. A steering gear according to claim 8, wherein said means projecting from said steering nut member comprises a head portion, and means for keeping said arm portion in constant engagement with said steering nut head portion including spring housing means secured to the end face of said steering lever shaft means, spring means within said spring housing means, said spring housing means forming one abutment surface for said spring means, and adjustable draw bolt means having a spring dish forming the other spring abutment for said spring means, said draw bolt extending through said spring housing means coaxially to the axis of said steering lever shaft means and being adjustable with respect to said housing means in the axial direction thereof.

18. A steering gear, especially for motor vehicles, provided with a housing, with a steering spindle supported within said housing and having an external thread means, a steering nut member on said spindle and having internal thread means, with circulatory anti-friction ball means in said thread means to operatively connect said steering spindle and said steering nut member, and with steering lever shaft means, comprising an arm portion operatively connected with said steering lever shaft means, sliding means guided within said arm portion and movable essentially radially with respect to the axis of said steering lever shaft means within said arm portion, a ball-type head portion on said steering nut member and engaging into a socket formed by said sliding means, said arm portion being constructed as a rail-like portion having an approximately U-shaped cross section open in the direction toward said steering nut member and provided with V-shaped inclined flank portions, said sliding means being provided with correspondingly inclined side surfaces, and anti-friction needle bearing means interposed between said inclined flank portions and said inclined side surfaces to enable essentially frictionless relative movement between said sliding means and said arm portion.

19. A steering gear, especially for motor vehicles, according to claim 18, wherein said housing includes a removable housing portion forming supporting surface means cooperating with complementary surface means at said steering nut member to provide a predetermined steering characteristic.

20. A steering gear, especially for motor vehicles according to claim 18, further comprising means operatively connected with said sliding means to limit the radial movement thereof with respect to the axis of said steering lever shaft means.

21. A steering gear, especially for motor vehicles according to claim 18, further comprising positive guide means for positively guiding said sliding means with respect to said steering nut member.

22. A steering gear, especially for motor vehicles according to claim 18, further comprising spring means having means for adjusting the spring tension thereof to maintain constant engagement between said arm portion and said ball-type head portion on said steering nut member.

References Cited in the file of this patent

UNITED STATES PATENTS

| | | |
|---|---|---|
| 1,351,937 | Alldredge | Sept. 7, 1920 |
| 1,967,482 | Schmidt | July 24, 1934 |
| 2,012,028 | Twyman | Aug. 20, 1935 |
| 2,019,927 | Porsche | Nov. 5, 1935 |
| 2,073,717 | Twyman | Mar. 16, 1937 |
| 2,648,994 | Doerfner et al. | Aug. 18, 1953 |
| 2,688,885 | Lincoln | Sept. 14, 1954 |
| 2,870,650 | Stump et al. | Jan. 27, 1959 |
| 2,972,261 | White | Feb. 21, 1961 |

FOREIGN PATENTS

| | | |
|---|---|---|
| 265,703 | Great Britain | Feb. 17, 1927 |